US 12,401,982 B2

United States Patent
Suh

(10) Patent No.: US 12,401,982 B2
(45) Date of Patent: Aug. 26, 2025

(54) METHOD AND APPARATUS FOR SUPPORTING MOBILITY FOR USER EQUIPMENT IN WIRELESS COMMUNICATION SYSTEM

(71) Applicant: Samsung Electronics Co., Ltd., Suwon-si (KR)

(72) Inventor: Kyungjoo Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 448 days.

(21) Appl. No.: 17/882,995

(22) Filed: Aug. 8, 2022

(65) Prior Publication Data

US 2023/0040531 A1 Feb. 9, 2023

(30) Foreign Application Priority Data

Aug. 6, 2021 (KR) ........................ 10-2021-0104203

(51) Int. Cl.
*H04W 8/18* (2009.01)
*H04W 4/90* (2018.01)
*H04W 60/00* (2009.01)

(52) U.S. Cl.
CPC ............. *H04W 4/90* (2018.02); *H04W 8/183* (2013.01); *H04W 60/00* (2013.01)

(58) Field of Classification Search
CPC .................................. H04W 4/90; H04W 8/18
See application file for complete search history.

(56) References Cited

U.S. PATENT DOCUMENTS

| 10,779,345 | B2 | 9/2020 | Faccin | |
|---|---|---|---|---|
| 2020/0351821 | A1* | 11/2020 | Wang | ..................... H04W 68/02 |
| 2022/0360962 | A1* | 11/2022 | Tseng | ...................... H04W 4/90 |

FOREIGN PATENT DOCUMENTS

| WO | 2020/030731 A1 | 2/2020 |
|---|---|---|
| WO | 2020/065007 A1 | 4/2020 |
| WO | 2020/202078 A1 | 10/2020 |

OTHER PUBLICATIONS

Ericsson; Discussion to SA1 LS S1-210368 on support of PWS over SNPN; 3GPP TSG-CT WG1 Meeting #130-e; C1-213014; Electronic meeting May 20-28, 2021; May 13, 2021.
Ericsson et al.; KI#3: Support for IMS emergency over SNPN; 3GPP TSG-SA WG2 Meeting #145-e (e-meeting); S2-2105205; (revision of S2-2103808); May 17-28, 2021; Elbonia; May 30, 2021.
International Search Report dated Oct. 28, 2022; International Appln. No. PCT/KR2022/011298.

(Continued)

*Primary Examiner* — Michael T Vu
(74) *Attorney, Agent, or Firm* — Jefferson IP Law, LLP

(57) ABSTRACT

The disclosure relates to a fifth generation (5G) or sixth generation (6G) communication system. A method performed by a user equipment (UE) in a wireless communication system is provided. The method includes selecting a stand-alone non-public network (SNPN) based on at least one of whether the SNPN supports a public warning system (PWS) or whether the SNPN supports an emergency call, transmitting, to a base station within the selected SNPN, a registration request message including information associated with supporting the PWS, and receiving, from the base station, a registration accept message.

14 Claims, 8 Drawing Sheets

(56) References Cited

OTHER PUBLICATIONS

3rd Generation Partnership Project; Technical Specification Group Services and System Aspects; IP Multimedia Subsystem (IMS) emergency sessions (Release 17), 3GPP TS 23.167 V17.1.0, Jun. 24, 2021, XP052029576.
Thales Dis, Support for SNPN primary authentication by USIM, C6-200151, 3GPP TSG-CT WG6 Meeting #98-e, Feb. 17, 2020, XP051848062.
Qualcomm Incorporated et al., Support for emergency services in SNPN, S2-2004200, SA WG2 Meeting #139E, May 22, 2020, XP052460996.
European Search Report dated Oct. 30, 2024, issued in European Application No. 22853393.1.

* cited by examiner

METHOD AND APPARATUS FOR SUPPORTING MOBILITY FOR USER EQUIPMENT IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0104203, filed on Aug. 6, 2021, in the Korean Intellectual Property Office, the disclosure of which is incorporated by reference herein in its entirety.

BACKGROUND

1. Field

The disclosure relates to a method and apparatus for supporting mobility for various user equipments (UEs) in a wireless communication system.

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement sixth generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive Multiple-Input Multiple-Output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step Random-Access Channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for supporting mobility for user equipment in wireless communication system.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes selecting a stand-alone non-public network (SNPN) based on at least one of whether the SNPN supports a public warning system (PWS) or whether the SNPN supports an emergency call, transmitting, to a base station within the selected SNPN, a registration request message including information associated with supporting the PWS, and receiving, from the base station, a registration accept message.

In accordance with another aspect of the disclosure, a user equipment (UE) in a wireless communication system is provided. The UE includes a transceiver, and at least one processor configured to select a stand-alone non-public network (SNPN) based on at least one of whether the SNPN supports a public warning system (PWS) or whether the SNPN supports an emergency call, transmit, to a base station within the selected SNPN, a registration request message including information associated with supporting the PWS, and receive, from the base station, a registration accept message.

In accordance with another aspect of the disclosure, a method performed by a base station in a wireless communication system is provided. The method includes receiving, from a user equipment (UE), a registration request message including information associated with supporting a public warning system (PWS), and transmitting, to the UE, a registration accept message, wherein the base station is within a stand-alone non-public network (SNPN) which is selected by the UE based on at least one of whether the SNPN supports the PWS or whether the SNPN supports an emergency call.

In accordance with another aspect of the disclosure, a base station in a wireless communication system is provided. The base station includes a transceiver, and at least one processor configured to receive, from a user equipment (UE), a registration request message including information associated with supporting a public warning system (PWS), and transmit, to the UE, a registration accept message, wherein the base station is within a stand-alone non-public network (SNPN) which is selected by the UE based on at least one of whether the SNPN supports the PWS or whether the SNPN supports an emergency call.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
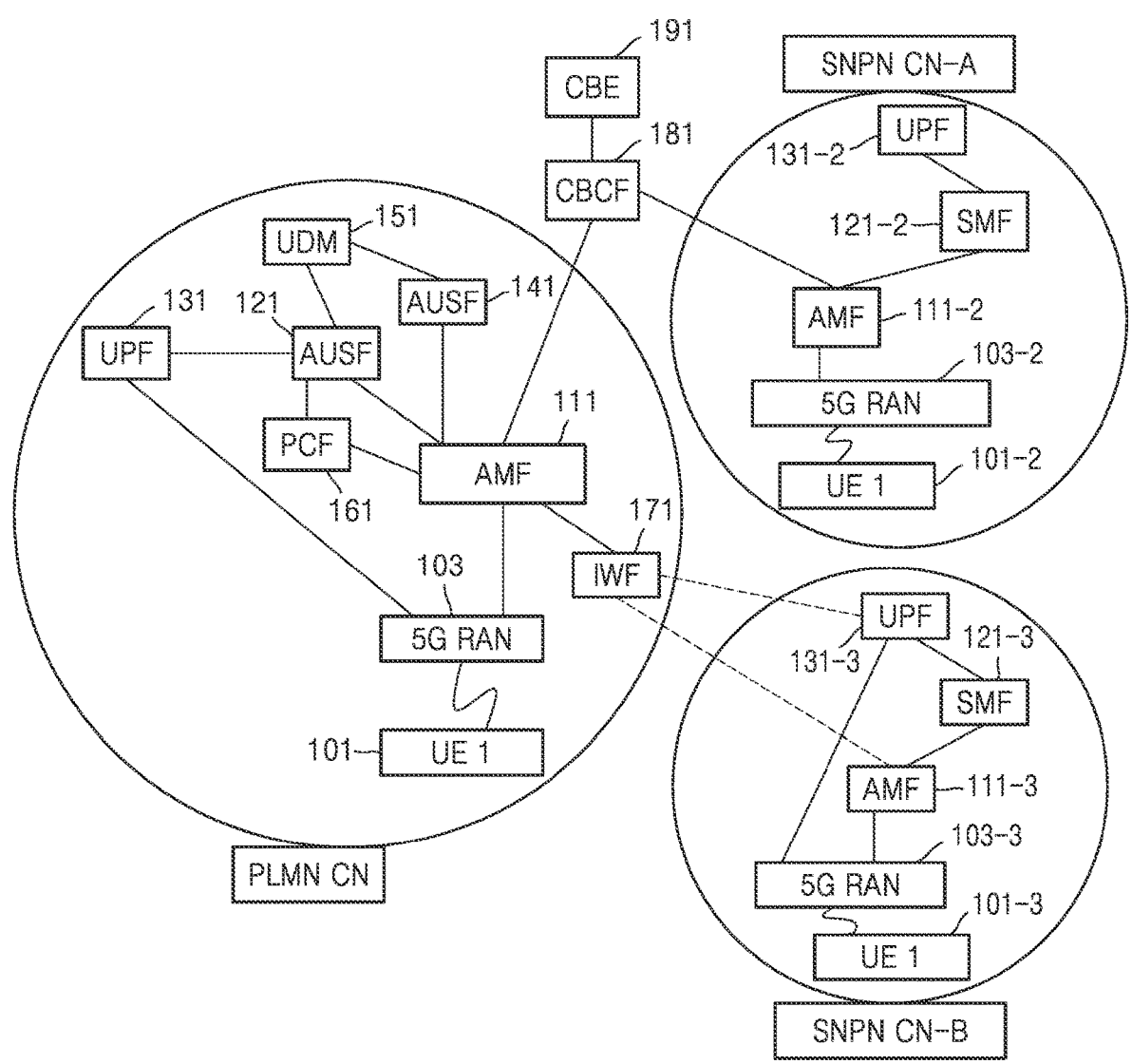
FIG. 1 illustrates a user equipment (UE) and network environment for supporting mobility for a UE in an environment where a public land mobile network (PLMN) and a stand alone non-public network (SNPN) coexist in a 5th generation (5G) network, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some elements in the accompanying drawings are exaggerated, omitted, or schematically illustrated. Also, the size of each element does not entirely reflect the actual size. The same reference numerals are assigned to the same or corresponding elements in the drawings.

Advantages and features of the disclosure, and methods of achieving them will be clarified with reference to embodiments of the disclosure described below in detail with reference to the accompanying drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the embodiments of the disclosure to those of ordinary skill in the art. The disclosure is only defined by the scope of the claims. The same reference numerals denote the same elements throughout the specification.

Throughout the disclosure, the expression "at least one of a, b or c" indicates only a, only b, only c, both a and b, both a and c, both b and c, all of a, b, and c, or variations thereof.

Throughout the specification, a layer may also be referred to as an entity.

It will be understood that the respective blocks of flowcharts and combinations of the flowcharts may be performed by computer program instructions.

Also, each block may represent part of a module, segment, or code that includes one or more executable instructions for executing a specified logical function(s). It should also be noted that, in some alternative implementations, the functions described in the blocks may occur out of the order noted in the drawings. For example, two blocks illustrated in succession may in fact be executed substantially concurrently, or the blocks may sometimes be executed in a reverse order, depending on the functions involved therein.

The term " . . . er/or" as used herein refers to a software element or a hardware element such as field programmable gate array (FPGA) or application specific integrated circuit (ASIC), and the " . . . er/or" performs certain functions. However, the term " . . . er/or" is not limited to software or hardware. The term " . . . er/or" may be configured in an addressable storage medium or may be configured to reproduce one or more processors. Therefore, for example, the term " . . . er/or" includes elements, such as software elements, object-oriented software elements, class elements, and task elements, processes, functions, attributes, procedures, subroutines, segments of program code, drivers, firmware, microcodes, circuits, data, databases, data structures, tables, arrays, and variables. Functions provided in the elements and the " . . . ers/ors" may be combined with fewer elements and " . . . ers/ors", or may be separated from additional elements and " . . . ers/ors." Furthermore, the elements and the " . . . ers/ors" may be implemented to reproduce one or more central processing units (CPUs) in the device or secure multimedia card. Also, in embodiments of the disclosure, the " . . . er/or" may include one or more processors.

The term for identifying an access node, the term referring to network entities, the term referring to messages, the term referring to an interface between network entities, the terms referring to a variety of identification information, and the like are exemplified for convenience of description. Therefore, the disclosure is not limited to the terms to be described later, and other terms referring to entities having an equivalent technical meaning may be used.

For convenience of description, the terms and names defined in the $3^{rd}$ generation partnership project long term evolution (3GPP LTE) standard or the terms and names modified based thereon are used herein. However, the disclosure is not limited by the terms and names and may be equally applied to systems conforming to other standards.

In describing embodiments of the disclosure in detail, the main focus is communication standards specified by the 3GPP. However, the main gist of the disclosure is applicable to other communication systems having a similar technical background with slight modifications, without significantly departing from the scope of the disclosure. This will be possible by the determination of those of ordinary skill in the art.

In a 5G or new radio (NR) system, an access and mobility management function (AMF), which is a management entity that manages mobility for a user equipment (UE) (or a terminal), is separated from a session management function (SMF), which is an entity that manages sessions. Accordingly, unlike a 4th generation long term evolution (4G LTE) communication system in which a mobility management entity (MME) performs both mobility management and session management, an entity performing mobility management and an entity performing session management are separated in the 5G or NR system, and thus, a communication method and a communication management method between a UE and a network entity are changed.

For non-3GPP access, the 5G or NR system performs mobility management through the AMF via non-3GPP interworking function (N3IWF) and performs session management through the SMF. In addition, security-related information, which is an important element in mobility management, is processed through the AMF.

As described above, in the 4G LTE system, the MME is responsible for both mobility management and session management. The 5G or NR system may support a non-standalone (NSA) architecture for performing communication by using the network entity of the 4G LTE system together.

The disclosure discloses a method of supporting mobility for a UE, an emergency call or public warning system (PWS) text message, guidance, and the like in an environment where a non-public network (NPN) and a public network (i.e., a general 3GPP cellular network) coexist in 5G communication.

In 5G communication, a private network, that is, an NPN, is used for supporting various vertical services and relates to the case of supporting a smart factory and the like. Examples of the private network include an NSA NPN and a stand-alone (SA) NPN. The disclosure discloses embodiments related to a case where the private network is the SA NPN. The SA NPN is a network that operates independently of a public land mobile network (PLMN), and is not identified by a PLMN identifier alone. Accordingly, the SA NPN is identified by an additional network identifier in addition to a PLMN identifier.

The disclosure discloses a method of supporting a PWS or emergency call in the SA NPN. The disclosure discloses a method of supporting mobility for a UE when the UE moves from a PLMN network, which is a 3GPP 5G communication network, to a network supporting an NPN. In the NPN, because there may be differences in whether an emergency call, PWS, or commercial mobile alert service (CMAS) is supported or a method of supporting an emergency call, PWS, or CMAS, there is a need to support the operation of the UE and the operation of the network therefor. Therefore, the disclosure discloses a method of supporting an emergency call, PWS, or CMAS when a UE moves from a PLMN to an NPN or when a UE moves from an NPN to a 5G communication PLMN.

According to embodiments of the disclosure, network communication performance may be improved through protocol efficiency, and communication may be performed efficiently.

FIG. 1 illustrates a UE and network environment for supporting mobility for a UE in an environment where a PLMN and a SNPN coexist in a 5G network, according to an embodiment of the disclosure.

Referring to FIG. 1, a 5G or NR core network may include network functions (NFs), such as user plane functions (UPFs) 131, 131-2, and 131-3, SMFs 121, 121-2, and 121-3, AMFs 111, 111-2, and 111-3, a 5G radio access network (RAN) 103, a user data management (UDM) 151, and a policy control function (PCF) 161. In addition, for authentication of these entities, the 5G or NR core network may include entities, such as an authentication server function (AUSF) 141 and an authentication, authorization and accounting (AAA). UEs 101, 101-2, and 101-3 may access the 5G core network through the 5G RAN (base station (BS)) 103. On the other hand, an N3IWF is present for a case where the UE performs communication through non-3GPP access. When the UE performs communication through non-3GPP access, session management is controlled by the UE, the non-3GPP access, the N3IWF, and the SMF, and mobility management is controlled by the UE, the non-3GPP access, the N3IWF, and the AMF.

In the 5G or NR system, entities that perform mobility management and session management are separated into the AMF 111 and the SMF 121. On the other hand, in the 5G or NR system, a stand-alone deployment architecture that communicates only with 5G or NR entities and a non-stand-alone deployment architecture that uses 4G entities and 5G or NR entities together are considered.

It is assumed that the communication network on which the disclosure is based is a 5G or 4G LTE network, but the same concept may be applied to other systems within the scope that may be understood by those of ordinary skill in the art.

The network on which the disclosure is based is a cell broadcast service (CBS), which serves as disaster prediction and warning system that delivers a disaster alert. Examples of disaster texts and disaster messages include texts and messages for informing country or disaster situations, such as heavy rain, heavy snowfall, earthquake, fire, flood, health, and disease. A cell broadcast entity (CBE) and a cell broadcast center function (CBCF) deliver disaster texts and disaster messages and are involved as described below. In 5G disaster alert broadcasting, a national alerting authority sends a disaster message and disaster area information (an administrative district-based local information) to the CBE in the event of a disaster. The CBE serves as an interface between the alerting authority and the telecommunication operator, but is not under the jurisdiction of the telecommunication operator. However, the CBE delivers the received disaster message and disaster area information to the CBCF. Areas following the CBCF are involved by the communication operator and conform to the protocols of the 3GPP international communication standards. The CBCF converts the disaster message and disaster area information into 5G CBS message standards set by the 3GPP international standards. The CBCF transmits a 5G CBS message to the AMF and the 5G RAN selected based on the disaster area information. The 5G RAN broadcasts the received CBS message to the UE in the 5G RAN cell.

On the other hand, FIG. 1 illustrates various embodiments (several examples of embodiment 1) of the SNPN according to whether the SNPN is capable of directly supporting the PWS, CMAS, and emergency call services.

In an embodiment of the disclosure, SNPN A is a SNPN capable of supporting the PWS, CMAS, and emergency call services (Embodiment 1)). In another embodiment of the disclosure, SNPN B is a SNPN that does not directly support the PWS, CMAS, and emergency call services in the SNPN (Embodiment 1-2)).

Although not indicated in FIG. 1 as another embodiment of the disclosure, a SNPN supports the PWS service, but does not support the emergency call service (Embodiment 1-3)). In another embodiment of the disclosure, a SNPN supports the emergency call service, but does not support the PWS service (Embodiment 1-4)).

As another embodiment of the disclosure, FIG. 1 illustrates various embodiments (several examples of Embodiment 2) of a SNPN access network section according to a radio RAN section supported by the SNPN.

In an embodiment of the disclosure, a 5G RAN, that is, an NG RAN may be used for the SNPN access network section (Embodiment 2-1)). In another embodiment of the disclosure, a non-3GPP access network may be used for the SNPN access network section (Embodiment 2-2)).

Figure 2:
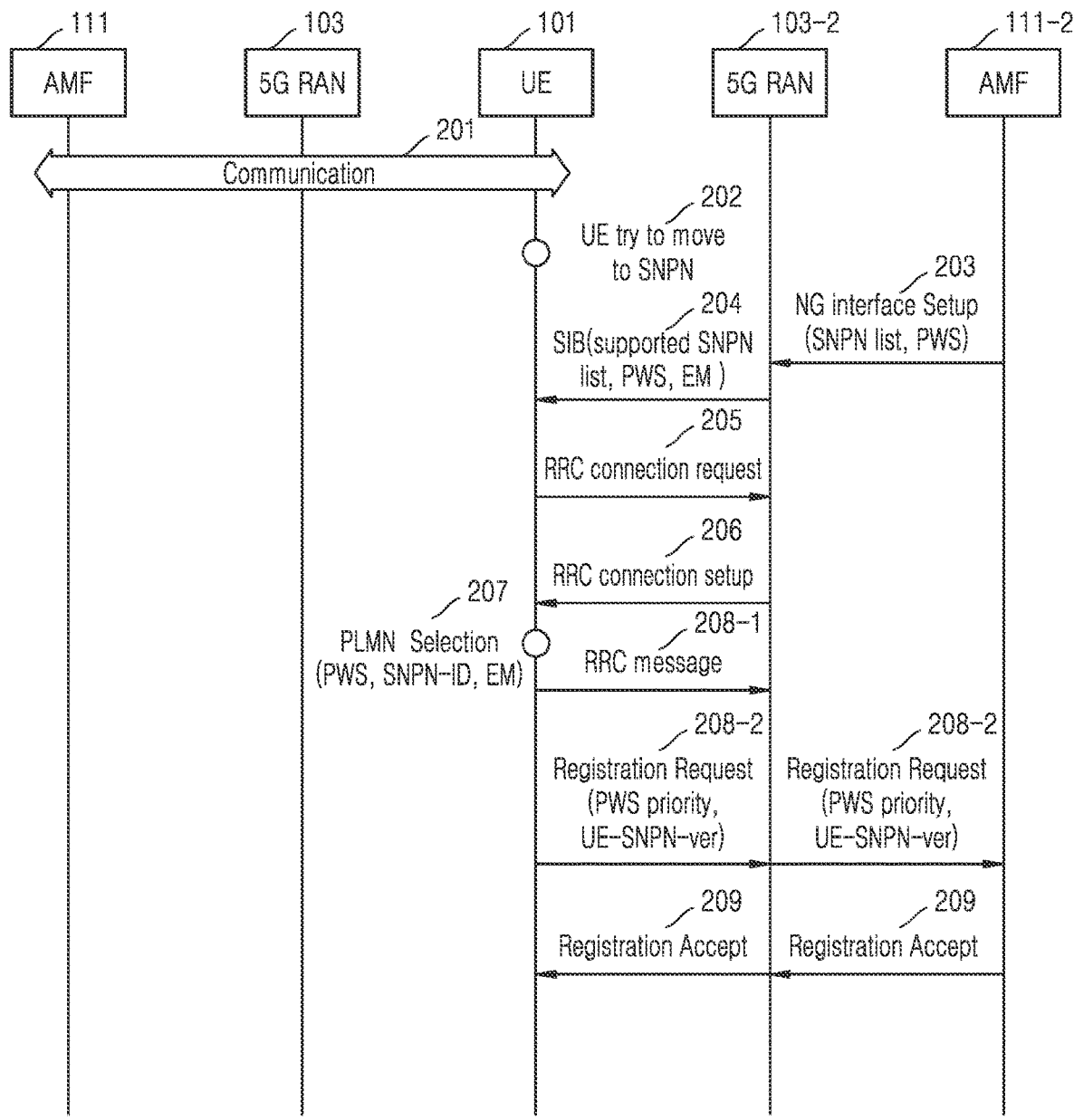
FIG. 2 is a flowchart for describing a procedure for supporting mobility for a UE in an environment where a PLMN and a SNPN coexist in a 5G network, according to an embodiment of the disclosure.

FIG. 2 is a flowchart for describing a procedure for supporting mobility for a UE in an environment where a PLMN and a SNPN coexist in a 5G network, according to an embodiment of the disclosure.

Referring to FIG. 2, in operation 201, a UE 101 performs communication in a public network of a communication operator, that is, a public PLMN.

In operation 202, the UE 101 may try to move to a SNPN corresponding to a private network while performing communication in the public network of the communication operator. In FIG. 2, the case of moving to SNPN A is described as an example, and accordingly, the 5G RAN 103-2 and the AMF 111-2 of SNPN A are described as an example. However, the embodiment of the disclosure illustrated FIG. 2 is not limited thereto and is applicable even to the case of moving to SNPN B. Accordingly, the embodiment of the disclosure illustrated FIG. 2 is applicable to the 5G RAN 103-3 and the AMF 111-3 of SNPN B.

Hereinafter, an operation in which the UE 101 moves from the public network to a NPN communication network, in which the UE 101 has an agreement with a telecommunication company to which the UE 101 subscribes, or a NPN, in which the access and registration of the UE 101 is permitted, and receives a service will be described.

In operation 203, the AMF 111-2 previously notifies the 5G RAN 103-2 of a SNPN list, a PWS support indication, or PWS support-related information through an NG interface setup. This process may be performed in the process of setting up the SNPN before evaluating and determining the support of the UE 101.

In operation 204, the 5G RAN 103-2 that has received the SNPN list and PWS-related information from the AMF 111-2 may transmit, to the UE 101, a supported SNPN list supported by the corresponding network, PWS-related information, and information about whether emergency call is supported, through a system information block (SIB).

In operation 205, the UE 101 may transmit a radio resource control (RRC) connection request message to the 5G RAN 103-2. In operation 205, the UE 101 in an idle state may attempt an RRC connection with the 5G RAN 103-2 in order to respond to a call attempt, data transmission attempt, or paging.

In operation 206, the UE 101 may receive, from the 5G RAN 103-2, an RRC connection setup message that is a response message. As an example, when the 5G RAN 103-2 accepts the connection request of the UE 101, the UE 101 may receive the RRC connection setup message from the 5G RAN 103-2. The 5G RAN 103-2 of the SNPN may transmit the RRC connection setup message to the UE 101 that has attempted the access to 5G.

In operation 207, the UE 101 may perform the following procedure in relation to PLMN selection. For example, the PLMN may be identified by a mobile country code (MCC) and a mobile network code (MNC). In particular, in the case of the NPN such as the SNPN, a network identity (ID) capable of identifying an individual network may be additionally used. PLMN information of the cell may be broadcast by being included in system information.

In operation 207, the UE 101 may select the PLMN (including selecting the PLMN, the NPN, etc.), considering whether the SNPN supports the PWS, an identifier (SNPN-ID) capable of identifying the SNPN, and an emergency support (EM) indication indicating whether the SNPN supports an emergency call.

The UE 101 may search for an available PLMN and select a PLMN capable of receiving a service. A non-access stratum (NAS) layer of the UE 101 may notify an access stratum (AS) layer that PLMN selection is required. The AS layer may search for the corresponding band and notify the NAS layer of a PLMN list.

The NAS layer of the UE 101 may select the PLMN for registering the UE 101 according to the priority order of PLMN/radio access technology (RAT) selection stored in a user services identity module (USIM).

The UE 101 may search for a suitable cell among cells to which the PLMN will belong, and may select a cell capable of providing an appropriate service. The suitable cell according to an embodiment of the disclosure may refer to a cell that allows the UE 101 to receive a suitable service, and the corresponding cell has to be an acceptable cell which belongs to a PLMN that is accessible by the UE 101 and in which the UE 101 is not prohibited from performing a registration procedure. In addition, when the corresponding cell is a closed access group (CAG) cell, the UE 101 may be a CAG member and the corresponding cell has to be a cell that is accessible by the UE 101.

On the other hand, a cell that allows the UE 101 to receive a limited service is referred to as an acceptable cell. The acceptable cell may refer to a cell in which the UE 101 is not barred from camping on the acceptable cell and which satisfies the cell selection criterion of the UE 101. That is, the acceptable cell may be a cell in which signal strength or signal quality is satisfied. The case where the UE 101 receives the limited service may be the case of receiving services related to an emergency call, an earthquake and tsunami warning system (ETWS), a PWS, a CMAS, etc, and the limited service described above may be provided in the acceptable cell.

Embodiment 1

Hereinafter, an automatic PLMN selection method according to an embodiment of the disclosure will be described. The priority order of the PLMN selection method may be as follows. In an embodiment of the disclosure, the UE 101 may select the PLMN in the following order.
1) Registered PLMN (RPLMN), equivalent PLMN (EPLMN), or nonpublic PLMN (NP-PLMN)

In the disclosure, the NP-PLMN may be a PLMN that allows the UE 101 to access or register to receive a service among the SNPN. When the UE 101 is successful in registering with a home PLMN (HPLMN), information about the NP-PLMN may be transmitted from the AMF 111-2 to the UE 101 by being included in a registration accept message.

Embodiment 1-1) According to an embodiment of the disclosure, NP-PLMN information may be transmitted by being included in the NP-PLMN list of the registration accept message.

Embodiment 1-2) According to an embodiment of the disclosure, NP-PLMN information may be transmitted by being included in the EPLMN list of the registration accept message. That is, Embodiment 1-2) is an embodiment of the disclosure in which the NP-PLMN, which is a PLMN that allows the UE 101 to access or register to receive a service among the SNPN, is transmitted from the AMF 111-2 to the UE 101 by using a list (i.e., information element (IE)) of transmitting the EPLMN.
2) User controlled PLMN and access technology
3) Operator controlled PLMN and access technology
4) PLMN reported as high quality PLMN by AS layer Embodiment 2

Hereinafter, an automatic PLMN selection method according to an embodiment of the disclosure will be described. The priority order of the PLMN selection method may be as follows. In an embodiment of the disclosure, the UE 101 may select the PLMN in the following order.
1) RPLMN or EPLMN
2) User controlled PLMN and access technology
3) Operator controlled PLMN and access technology The operator controlled PLMN may refer to information that the communication operator provides to the UE 101 (hereinafter, operator controlled PLMN or operator controlled PLMN list). The operator controlled PLMN may include information about the PLMN configured in the USIM by the communication operator.

According to an embodiment of the disclosure, information about the NP-PLMN, which is a PLMN that allows the UE 101 to access or register to receive a service among the SNPN, may be provided by the operator controlled PLMN.

Embodiment 3-1) According to an embodiment of the disclosure, information about the NP-PLMN may be configured in the UE 101 in a form that is pre-configured in the operator controlled PLMN list and is stored in the USIM.

Embodiment 3-2) According to an embodiment of the disclosure, information about the NP-PLMN may be configured from the AMF 111-2 to the UE 101, and the information about the NP-PLMN may be stored in the operator controlled PLMN list. The embodiment of the disclosure may be a method of allowing the UE 101 to select the PLMN from the operator controlled PLMN based on the priority for selecting the PLMN.

In the disclosure, the NP-PLMN may be a PLMN that allows the UE 101 to access or register to receive a service among the SNPN. When the UE 101 is successful in registering with HPLMN, the NP-PLMN may be transmitted from the AMF 111-2 to the UE 101 by being included in the registration accept message.

Embodiment 3-2-1) According to an embodiment of the disclosure, the NP-PLMN may be transmitted by being included in the NP-PLMN list of the registration accept message. Upon receiving the registration accept message, the UE 101 may store the NP-PLMN list in the operator controlled PLMN.

Embodiment 3-2-2) According to an embodiment of the disclosure, the NP-PLMN may be transmitted by being included in the registration accept message. That is, this case may be a case where the NP-PLMN, which a PLMN that allows the UE 101 to access or register to receive a service among the SNPN, is transmitted from the AMF 112-2 to the UE 101 by using the NP-PLMN IE. When the UE 101 receives the corresponding information, the UE 101 may store the received information in the operator controlled PLMN.

4) PLMN reported as high quality PLMN by AS layer

Embodiment 3

Hereinafter, an automatic PLMN selection method according to an embodiment of the disclosure will be described. The priority order of the PLMN selection method may be as follows. In an embodiment of the disclosure, the UE 101 may select the PLMN in the following order.

1) RPLMN or EPLMN
2) User controlled PLMN and access technology
3) Operator controlled PLMN and access technology
4) PLMN reported as high quality PLMN by AS layer According to an embodiment of the disclosure, when there is a PLMN registered with an operator as an NP-PLMN, which is a PLMN that allows the UE 101 to access or register to receive a service among the SNPN, among the PLMNs reported as high quality PLMNs by the AS layer, the corresponding PLMN may be treated as an NP-PLMN.

Embodiment 4-1) According to an embodiment of the disclosure, information about the NP-PLMN may be configured in the UE 101 in a form that is pre-configured in a PLMN list registered with an operator as an NP-PLMN, which is a PLMN that allows the UE 101 to access and register to receive a service among the SNPN, and is stored in the USIM.

Embodiment 4-2) In the PLMN registered with an operator as an NP-PLMN, which is a PLMN that allows the UE 101 to access and register to receive a service among the SNPN, among high quality PLMNs satisfying at least one of signal strength or signal quality, when the access to the corresponding PLMN is permitted, the information about the NP-PLMN may be stored in an NP-PLMN list. In the disclosure, the NP-PLMN may be a PLMN that allows the UE 101 to access and register to receive a service among the SNPN.

Embodiment 4

Hereinafter, a manual PLMN selection method according to an embodiment of the disclosure will be described. The manual PLMN selection method may be a method by which a user selects one PLMN from a PLMN list provided by an AS layer of a UE 101.

In an embodiment of the disclosure, when the UE 101 successfully completes location registration, the selected PLMN may be a RPLMN, and the RPLMN may be a PLMN in which location registration has been successfully performed. In an embodiment of the disclosure, an EPLMN may be a PLMN treated as equivalent to the RPLMN. In addition, a visited PLMN (VPLMN) may refer to a PLMN when the UE 101 is in a roaming state and a service is provided to the UE 101. According to another embodiment of the disclosure, there may be a NP-PLMN, which is a PLMN that allows the UE 101 to access and register to receive a service among the SNPN.

In operation 208-1, the UE 101 may transmit a RRC message to the 5G RAN 103-02. The RRC message may include a NAS message of operation 208-2.

The NAS message of operation 208-2 may be transmitted from the UE 101 to the AMF 111-2. In FIG. 2, operations 208-1 and 208-2 are illustrated separately, but the NAS message of operation 208-2 may be included in the RRC message of operation 208-1 and transmitted from the UE 101 to the AMF 111-2 through the 5G RAN 103-2.

In operation 208-1, the UE 101 may transmit an RRC connection setup complete message to the 5G RAN 103-2, and the UE 101 may transition to a RRC connection mode.

A registration request message, which is a type of NAS message, may be carried in the RRC message (e.g., the RRC connection setup complete message) transmitted in operation 208-1. The registration request message, which is a type of NAS message, may be included in the RRC message. Alternatively, the registration request message, which is a type of NAS message, may be piggybacked or concatenated and carried in the RRC message.

In operations 208-2 and 209, the UE 101 may perform a registration procedure in the 5G network through the 5G NG-RAN 103-2 and the AMF 111-2, which are present in the SNPN. In this manner, the UE 101 may be registered with the AMF 111-2 of the 5G network.

The registration request message transmitted in operation 208 may include PWS priority information and UE-SNPN-version information. The PWS priority information (or PWS priority indication information) may be an indicator indicating that the UE 101 wants to access a network supporting a PWS with priority. The UE-SNPN version information is information notifying the network that the UE supports the PWS in relation to the SNPN. For example, a UE of 3GPP release 16 and release 15 may not support the PWS in the SNPN.

In operation 209, when the AMF 111-2 permits registration of the UE 101, the AMF 111-2 may transmit a registration accept message to the UE 101. When the AMF 111-2 supports an emergency call within the SNPN of the UE 101, the AMF 111-2 may transmit an emergency call number supported in the SNPN to the UE by including the emergency call number in the registration accept message. Upon receiving the registration accept message, the UE 101 may operate in various embodiments of the disclosure in operations subsequent to operation 209.

Embodiment 1) According to an embodiment of the disclosure, the UE 101 may delete the previously received emergency call number and may store a newly received emergency call number.

Embodiment 2) According to an embodiment of the disclosure, the UE 101 may update the emergency call number with the newly received emergency call number and may store the updated emergency call number.

Embodiment 3) According to an embodiment of the disclosure, the UE 101 may store the newly received emergency call number while maintaining the previously received emergency call number.

Thereafter, upon receiving an emergency call, the UE 101 may use the stored emergency call number to map the number matching the emergency situation received from the user when the UE 101 is in the SNPN with the emergency call number supported in its own SNPN and may perform an emergency call operation, such as making a phone call or a text message as an emergency call, by mapping to a number supporting an accurate emergency call.

Figure 3:
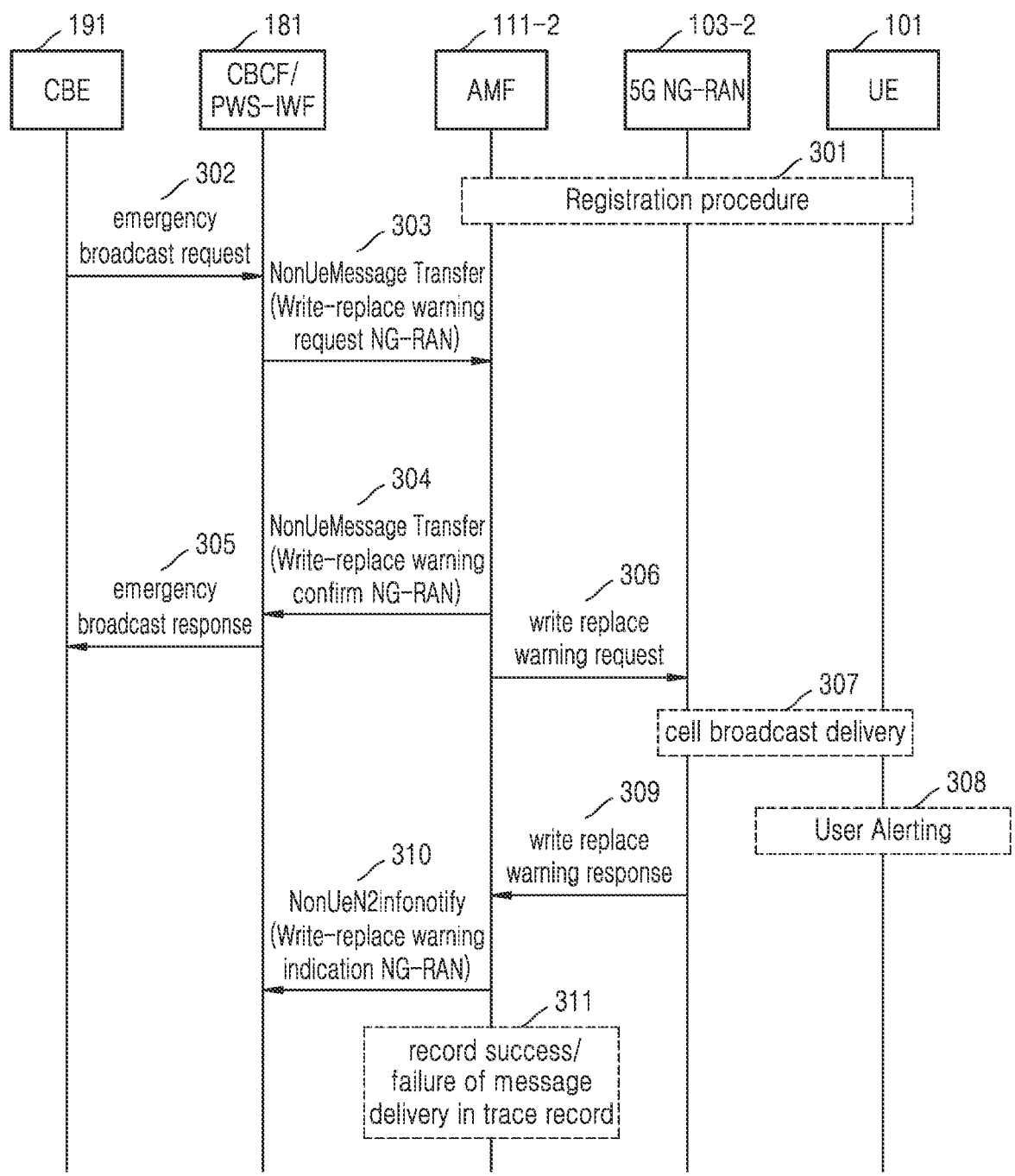
FIG. 3 is a flowchart for describing a procedure for supporting mobility for a UE in an environment where a PLMN and a SNPN coexist in a 5G network, according to an embodiment of the disclosure.

FIG. 3 is a flowchart for describing a procedure for supporting mobility for a UE in an environment where a PLMN and a SNPN coexist in a 5G network, according to an embodiment of the disclosure.

FIG. 3 is a flowchart for describing a process of efficiently delivering a PWS message and a disaster text or an emergency disaster message, such as fire, earthquake, tsunami, heavy rain, storm, heavy snow, disease, and health, in an environment where a 5G communication network and a NPN coexist, according to an embodiment of the disclosure.

FIG. 3 illustrates a process of delivering a public warning message, a CMAS message, or a text message through a network entity in a NPN, according to an embodiment of the disclosure. Accordingly, the embodiment of the disclosure illustrated in FIG. 3 relates to a case where the AMF, the 5G NG-RAN, and the like may use the AMF, the 5G NG-RAN, and the like of the NPN rather than the AMF and the 5G NG-RAN of the 3GPP operator network, that is, the general public network.

In addition, FIG. 3 illustrates an example of a case where the SNPN is capable of supporting both the PWS and the emergency call. Referring to FIG. 1, SNPN A supports both the PWS and the emergency call, and the AMF 111-2 and the 5G RAN 103-2 (specifically, 5G NR base station) may be used. Therefore, in the embodiment of the disclosure, the disaster message may be delivered through the path of the CBE—the CBCF—the AMF of the SNPN—the 5G NG-RAN of the SNPN.

Referring to FIG. 3, in operation 301, the UE 101 may perform a registration procedure in the 5G network through the 5G NG-RAN 103-2 and the AMF 111-2, which are present in the SNPN. In this manner, the UE 101 may be registered with the AMF 111-2 of the 5G network.

In operation 302, the CBE 191 may transmit, to the CBCF 181, an emergency broadcast request message for transmission of the emergency message at a specific time point when the transmission of the emergency message is required.

Upon receiving the emergency broadcast request message, the CBCF 181 may transmit a NonUEMessageTransfer message to the AMF 111-2 in operation 303. The NonUEMessageTransfer message may include a write replace warning request NG-RAN message or may include an encapsulated write replace warning request NG-RAN message.

In operation 304, the AMF 111-2 may generate a NonUeMessageTransfer message in response to the received NonUEMessageTransfer message and transmit the generated NonUeMessageTransfer message to the CBCF 181. The NonUeMessageTransfer message, which is the response message, may include a write replace warning confirm NG-RAN message or may include an encapsulated write replace warning confirm NG-RAN message.

Accordingly, in operation 305, the CBCF 181 may transmit an emergency broadcast response message to the CBE 191 to notify that an emergency broadcast message may be transmitted.

In operation 306, the AMF 111-2 may transmit a write replace warning request message to the SNPN access, that is, the 5G RAN 103-2 in an embodiment of the disclosure.

The write replace warning request message may support multiple concurrent warning message delivery. The multiple concurrent warning message delivery may refer to a case where the same message is concurrently transmitted through the operator network by different warning message providers, or a case where a plurality of warning messages are transmitted by updating the contents, instructions, and information of the message. In addition, the warning message may be one of the aforementioned emergency messages or the emergency message itself. In the following description, it is assumed that a warning message is the same as the emergency message. In addition, the multiple concurrent warning message delivery may be used for the following cases.

Embodiment A) There may be a case where a warning message is transmitted from two different sources or two different warning notification providers to the 5G RAN 103-2. Therefore, the 5G RAN 103-2 may receive two CMAS notification or CMAS messages, PWS notification messages, PWS messages, and the like. In this case, in the two warning notification messages, message identifiers may be different from each other, and values of serial numbers may be the same as each other. This is because the serial numbers are used to distinguish the case where the sources of the warning messages, that is, the sources for distributing the warning messages are the same as each other. When the sources of the warning messages are different from each other because the warning message providers are different from each other, messages are transmitted from two sources, and thus, the identifiers of the messages are different from each other. However, the serial numbers used to distinguish the messages in each source may be the same as each other.

Example B) According to another embodiment of the disclosure, there may be a case where the warning messages are transmitted from the same warning notification provider to the 5G RAN 103-2. In this case, there may be a case where new information or new instruction is delivered or previously transmitted information is updated. In this case, when the warning notification provider transmits a warning notification to the network operator (PLMN operator), that is, the 5G RAN 103-2, the warning notification provider may update the warning message by identifying the warning notification transmitted previously through the warning message identifier.

Embodiment C) According to another embodiment of the disclosure, there may be a case where the warning messages are transmitted from the same warning notification provider to the 5G RAN 103-2. In this case, there may be a case where new information or new instruction is delivered, or is concurrent delivered in addition to the previously transmitted information. In this case, when the warning notification provider transmits warning notifications to the network operator (PLMN operator), that is, the 5G RAN 103-2, the serial numbers of the warning notifications may be different from each other in addition to identifying a previously transmitted warning notification through a warning message identifier. In addition, in this case, a concurrent warning message indicator information element (IE) may be provided. Therefore, in a case where concurrent message transmission is supported, when the identifiers of the warning messages are the same as each other and the serial numbers thereof are different from each other, and when the concurrent warning message indicator IE is provided, the warning messages may be transmitted concurrently.

Embodiment D) According to another embodiment of the disclosure, in the warning notification message, when the identifiers of the warning messages are the same as each other and the message serial numbers thereof are the same as each other, only one warning message may be broadcast. In this manner, the UE 101 may receive the warning notification message.

In operation 307, the NG-RAN 103-2 may deliver a public warning message, a warning message, or an emergency call message to the UE 101 through cell broadcast.

Accordingly, upon receiving the emergency (or warning) message broadcast in operation 307, the UE 101 may alert warning-related information (warning message) to the user in operation 308. The alerting to the user may be performed in various methods. For example, information may be provided to the user by a method of displaying information on a display included in the UE 101 and/or a method of notifying information to a user by using sound or vibration.

In operation 309, the NG-RAN 103-2 may transmit, to the AMF 111, a write replace warning response message that is a response message to a write replace warning request message.

In this case, operation 309 may be performed after operation 306, before operation 307 of Embodiment 1), or after operation 307 of Embodiment 2). Because the warning message is broadcast in the cell, there is no need to check or receive the response from the UE 101.

In operation 310, the AMF 111-2 may transmit a NonUeN2infonotify message to the CBCF 181. The NonUeN2infonotify message may include a write replace warning indication NG-RAN message or may include an encapsulated write replace warning indication NG-RAN message.

In operation 311, the AMF 111-2 may record success or fail of message delivery in a trace record. Success or fail of recording in the trace record in the AMF 111-2 may not actually mean success or fail of reception in the UE 101. The emergency (or warning) message may be generally transmitted to all UEs in the cell, or may be transmitted only to UEs that are pre-configured to receive the emergency message. Because the emergency message is broadcast in the cell unlike the general message, the 5G RAN does not reply the response to the success or fail of reception from the UEs. Therefore, the AMF 111-2 may record the case of transmitting the emergency message to the 5G RAN 103-2 as delivery success, and may record the case of not transmitting the emergency message to the 5G-RAN 103-2 as delivery fail.

Figure 4:
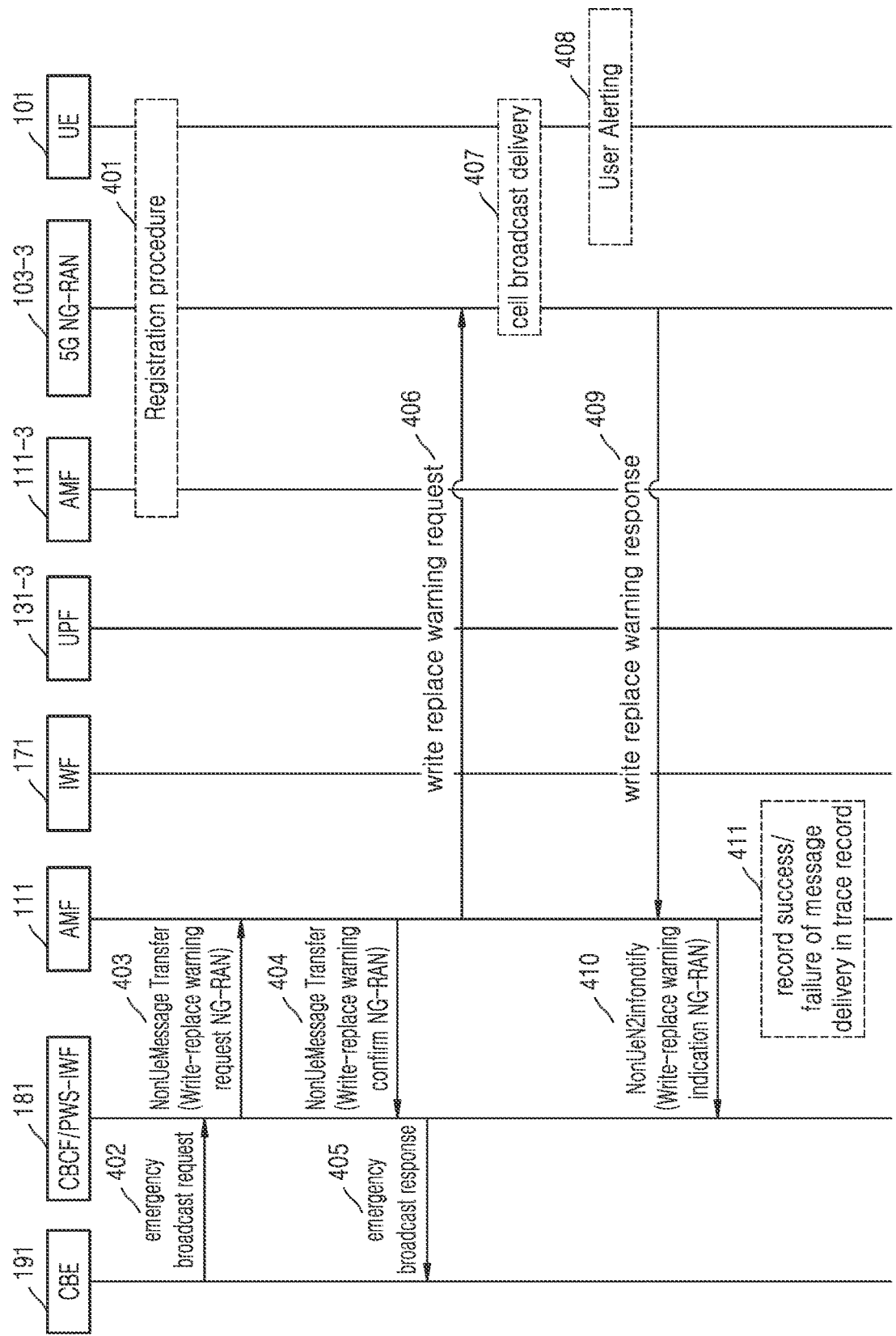
FIG. 4 is a flowchart for describing a procedure for supporting mobility for a UE in an environment where a PLMN and a SNPN coexist in a 5G network, according to an embodiment of the disclosure.

FIG. 4 is a flowchart for describing a procedure for supporting mobility for a UE in an environment where a PLMN and a SNPN coexist in a 5G network, according to an embodiment of the disclosure.

FIG. 4 is a flowchart for describing a process of efficiently delivering a PWS message and a disaster text or an emergency disaster message, such as fire, earthquake, tsunami, heavy rain, storm, heavy snow, disease, and health, in an environment where a general 5G communication network and a NPN coexist, according to an embodiment of the disclosure.

FIG. 4 illustrates a process of delivering a public warning message, a CMAS message, or a text message through a network entity in a NPN, according to an embodiment of the disclosure. Accordingly, the embodiment of the disclosure illustrated in FIG. 4 is an example of a case where the 5G NG-RAN and the like may use the 5G NG-RAN and the like of the NPN rather than the 5G NG-RAN of the 3GPP operator network, that is, the general public network.

In addition, FIG. 4 illustrates an example of a case where the SNPN is capable of supporting the PWS and the emergency call. However, in the case of FIG. 4, unlike the case of FIG. 3, there is no interface directly connected from the CBCF of the operator network to the SNPN. That is, when there is no interface directly connected from the CBCF to the SNPN, various embodiments of the disclosure are possible.

Embodiment 1) According to an embodiment of the disclosure, referring to FIG. 4, the disaster message may be delivered to the UE through an interworking function (IWF) connected to the AMF of the public network and the UPF and the 5G NG-RAN of the SNPN. This is the case of delivering the disaster message to the AMF of the public network→the IWF of the public network→the UPF of the SNPN→5G NG-RAN of the SNPN.

Figure 5:
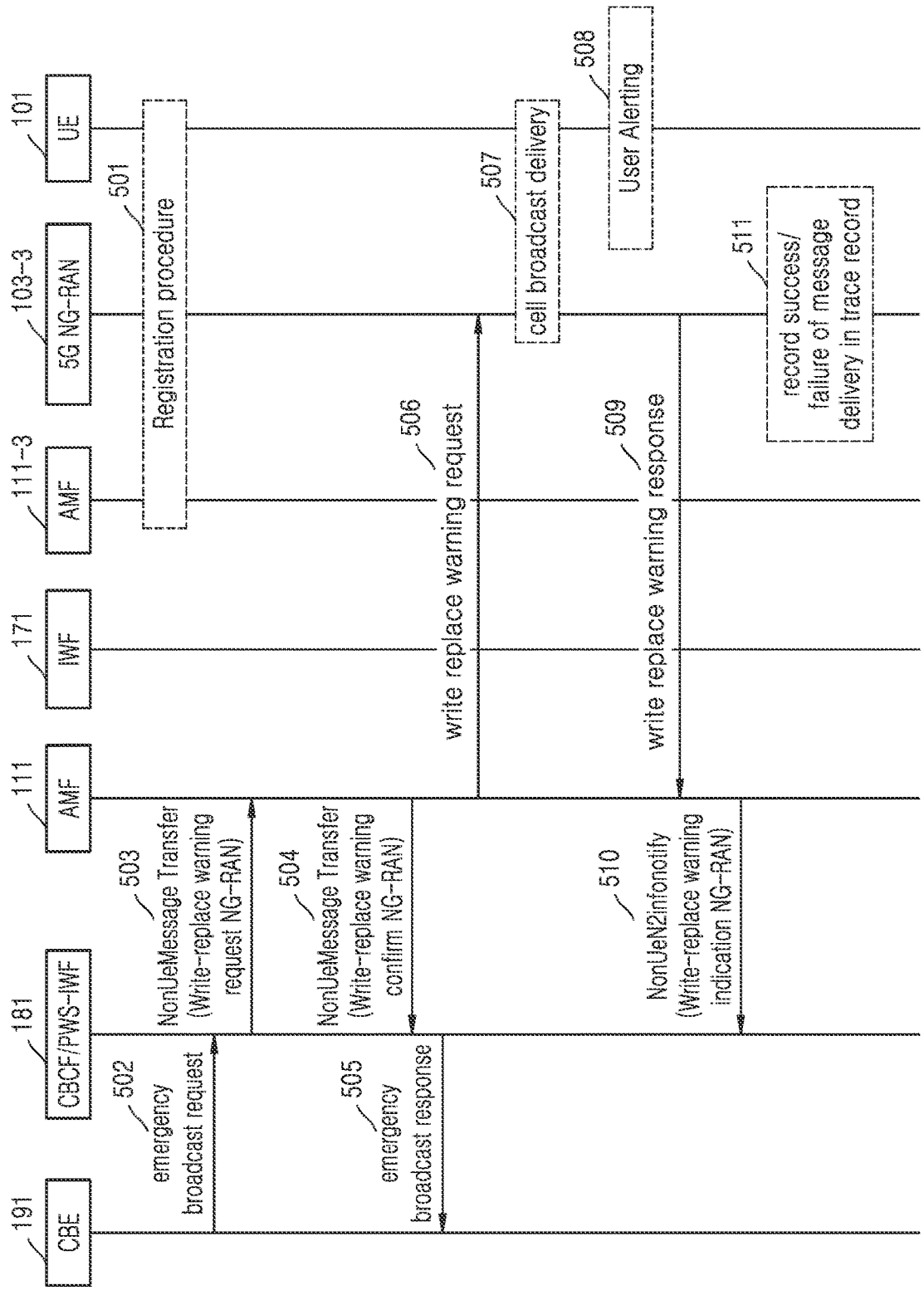
FIG. 5 is a flowchart for describing a procedure for supporting mobility for a UE in an environment where a PLMN and a SNPN coexist in a 5G network, according to an embodiment of the disclosure.

Embodiment 2) According to another embodiment of the disclosure, as illustrated in FIG. 5, the disaster message may be delivered from the AMF of the public network to the UE through the IWF of the public network, the AMF of the SNPN, and the 5G NG-RAN of the SNPN. This is the case of delivering the disaster message to the AMF of the public network→the IWF of the public network→the AMF of the SNPN→the 5G NG-RAN of the SNPN→the UE.

Referring to FIG. 4, in operation 401, the UE 101 may perform a registration procedure in the 5G network through the 5G NG-RAN 103-3 and the AMF 111-3, which are present in the SNPN. In this manner, the UE 101 may be registered with the AMF 111-3 of the 5G network.

In operation 402, the CBE 191 may transmit, to the CBCF 181, an emergency broadcast request message for transmission of the emergency message at a specific time point when the transmission of the emergency message is required.

Upon receiving the emergency broadcast request message, the CBCF 181 may transmit a NonUEMessageTransfer message to the AMF 111-2 of the public network in operation 403. The NonUEMessageTransfer message may include a write replace warning request NG-RAN message or may include an encapsulated write replace warning request NG-RAN message.

In operation 404, the AMF 111 of the public network may generate a NonUeMessageTransfer message in response to the NonUEMessageTransfer message and transmit the generated NonUeMessageTransfer message to the CBCF 181. The NonUeMessageTransfer message, which is the response message, may include a write replace warning confirm NG-RAN message or may include an encapsulated write replace warning confirm NG-RAN message.

Accordingly, in operation 405, the CBCF 181 may transmit an emergency broadcast response message to the CBE 191 to notify that an emergency broadcast message may be transmitted.

In operation 406, the AMF 111 of the public network may transmit a write replace warning request message to the SNPN access, that is, the 5G RAN 103-3 in an embodiment of the disclosure, through the IWF 171 and the UPF 131-3. In this case, the IWF 171 and the UPF 131-3 are only involved in the routing (transmission) of the write replace warning request message, and does not decode the write replace warning request message.

The write replace warning request message may support multiple concurrent warning message delivery. The multiple concurrent warning message delivery may refer to a case where the same message is concurrently transmitted through the operator network by different warning message providers, or a case where a plurality of warning messages are transmitted by updating the contents, instructions, and information of the message. In addition, the warning message may be one of the aforementioned emergency messages or the emergency message itself. In the following description, it is assumed that a warning message is the same as the emergency message. In addition, the multiple concurrent warning message delivery may be used for the following cases.

Embodiment A) There may be a case where a warning message is transmitted from two different sources or two different warning notification providers to the 5G RAN 103-3. Therefore, the 5G RAN 103-3 may receive two CMAS notification or CMAS messages, PWS notification messages, PWS messages, and the like. In this case, in the two warning notification messages, message identifiers may be different from each other, and values of serial numbers may be the same as each other. This is because the serial numbers are used to distinguish the case where the sources of the warning messages, that is, the sources for distributing the warning messages are the same as each other. When the sources of the warning messages are different from each other because the warning message providers are different from each other, messages are transmitted from two sources, and thus, the identifiers of the messages are different from each other. However, the serial numbers used to distinguish the messages in each source may be the same as each other.

Example B) According to another embodiment of the disclosure, there may be a case where the warning messages are transmitted from the same warning notification provider to the 5G RAN 103-3. In this case, there may be a case where new information or new instruction is delivered or previously transmitted information is updated. In this case, when the warning notification provider transmits a warning notification to the network operator (PLMN operator), that is, the 5G RAN 103-3, the warning notification provider may update the warning message by identifying the warning notification transmitted previously through the warning message identifier.

Embodiment C) According to another embodiment of the disclosure, there may be a case where the warning messages are transmitted from the same warning notification provider to the 5G RAN 103-3. This case may correspond to a case where new information or new instruction is delivered, or is concurrently delivered in addition to the previously transmitted information. In this case, when the warning notification provider transmits warning notifications to the network operator (PLMN operator), that is, the 5G RAN 103-3, the serial numbers of the warning notifications may be different from each other in addition to identifying a previously transmitted warning notification through a warning message identifier. In addition, in this case, a concurrent warning message indicator IE may be provided. Therefore, in a case where concurrent message transmission is supported, when the identifiers of the warning messages are the same as each other and the serial numbers thereof are different from each other, and when the concurrent warning message indicator IE is provided, the warning messages may be transmitted concurrently.

Embodiment D) According to another embodiment of the disclosure, in the warning notification message, when the identifiers of the warning messages are the same as each other and the message serial numbers thereof are the same as each other, only one warning message may be broadcast. In this manner, the UE 101 may receive the warning notification message.

In operation 407, the NG-RAN 103-3 may deliver a public warning message, a warning message, or an emergency call message to the UE 101 through cell broadcast.

Accordingly, upon receiving the emergency (or warning) message broadcast in operation 407, the UE 101 may alert warning-related information (warning message) to the user in operation 408. The alerting to the user may be performed in various methods. For example, information may be provided to the user by a method of displaying information on a display included in the UE 101 and/or a method of notifying information to a user by using sound or vibration.

In operation 409, the NG-RAN 103-3 may transmit, to the AMF 111 of the public network, a write replace warning response message that is a response message to a write replace warning request message. In this case, the IWF 171 or the UPF 131-3 is only involved in the routing (transmission) of the write replace warning response message, and does not decode the write replace warning response message.

In this case, operation 409 may be performed after operation 406, before operation 407 of Embodiment 1), or after operation 407 of Embodiment 2). Because the warning message is broadcast in the cell, there is no need to check or receive the response from the UE 101.

In operation 410, the AMF 111 may transmit a NonUeN2infonotify message to the CBCF 181. The NonUeN2infonotify message may include a write replace warning indication NG-RAN message or may include an encapsulated write replace warning indication NG-RAN message.

In operation 411, the AMF 111 may record success or fail of message delivery in a trace record. Success or fail of recording in the trace record in the AMF 111 may not actually mean success or fail of reception in the UE 101. The emergency (or warning) message may be generally transmitted to all UEs in the cell or may be transmitted only to UEs that are pre-configured to receive the emergency message. Because the emergency message is broadcast in the cell unlike the general message, the 5G RAN does not reply the response to the success or fail of reception from the UEs. Therefore, the AMF 111 may record the case of transmitting the emergency message to the 5G RAN 103-2 as delivery success, and may record the case of not transmitting the emergency message to the 5G-RAN 103-2 as delivery fail.

FIG. 5 is a flowchart for describing a procedure for supporting mobility for a UE in an environment where a PLMN and a SNPN coexist in a 5G network, according to an embodiment of the disclosure.

FIG. 5 is a flowchart for describing a process of efficiently delivering a PWS message and a disaster text or an emergency disaster message, such as fire, earthquake, tsunami, heavy rain, storm, heavy snow, disease, and health, in an environment where a general 5G communication network and a NPN coexist, according to an embodiment of the disclosure.

FIG. 5 illustrates a process of delivering a public warning message, a CMAS message, or a text message through a network entity in a NPN, according to an embodiment of the disclosure. Accordingly, the embodiment of the disclosure illustrated in FIG. 5 relates to a case where the AMF, the 5G NG-RAN, and the like may use the AMF, the 5G NG-RAN, and the like of the NPN rather than the AMF and the 5G NG-RAN of the 3GPP operator network, that is, the general public network.

In addition, FIG. 5 illustrates an example of a case where the SNPN is capable of supporting the PWS and the emergency call. However, in the case of FIG. 5, unlike the case of FIG. 3, there is no interface directly connected from the CBCF of the operator network to the SNPN. That is, when there is no interface directly connected from the CBCF to the SNPN, various embodiments of the disclosure are possible.

Embodiment 1) According to an embodiment of the disclosure, referring to FIG. 4, the disaster message may be delivered to the UE through an IWF connected to the AMF of the public network and the UPF and the 5G NG-RAN of the SNPN. This is the case of delivering the disaster message to the AMF of the public network→the IWF of the public network→the UPF of the SNPN→the 5G NG-RAN of the SNPN.

Embodiment 2) According to another embodiment of the disclosure, as illustrated in FIG. 5, the disaster message may be delivered from the AMF of the public network to the UE through the IWF of the public network, the AMF of the SNPN, and the 5G NG-RAN of the SNPN. This is the case of delivering the disaster message to the AMF of the public network→the IWF of the public network→the AMF of the SNPN→the 5G NG-RAN of the SNPN→the UE.

Referring to FIG. 5, in operation 501, the UE 101 may perform a registration procedure in the 5G network through the 5G NG-RAN 103-3 and the AMF 111-3, which are present in the SNPN. In this manner, the UE 101 may be registered with the AMF 111-3 of the 5G network.

In operation 502, the CBE 191 may transmit, to the CBCF 181, an emergency broadcast request message for transmission of the emergency message at a specific time point when the transmission of the emergency message is required.

Upon receiving the emergency broadcast request message, the CBCF 181 may transmit a NonUEMessageTransfer message to the AMF 111 of the public network in operation 503. The NonUEMessageTransfer message may include a write replace warning request NG-RAN message or may include an encapsulated write replace warning request NG-RAN message.

In operation 504, the AMF 111 of the public network may generate a NonUeMessageTransfer message in response to the NonUEMessageTransfer message and transmit the generated NonUeMessageTransfer message to the CBCF 181. The NonUeMessageTransfer message, which is the response message, may include a write replace warning confirm NG-RAN message or may include an encapsulated write replace warning confirm NG-RAN message.

Accordingly, in operation 505, the CBCF 181 may transmit an emergency broadcast response message to the CBE 191 to notify that an emergency broadcast message may be transmitted.

In operation 506, the AMF 111 of the public network may transmit a write replace warning request message to the SNPN access, that is, the 5G RAN 103-3 in an embodiment of the disclosure, through the IWF 171 and the AMF 111-3 of the SNPN. In this case, the IWF 171 is only involved in the routing (transmission) of the write replace warning request message, and does not decode the write replace warning request message.

In operation 506, the AMF 111 may transmit a write replace warning request message to the SNPN access, that is, the 5G RAN 103-3 in an embodiment of the disclosure, through the IWF 171 and the AMF 111-3 of the SNPN.

The write replace warning request message may support multiple concurrent warning message delivery. The multiple concurrent warning message delivery may refer to a case where the same message is concurrently transmitted through the operator network by different warning message providers, or a case where a plurality of warning messages are transmitted by updating the contents, instructions, and information of the message. In addition, the warning message may be one of the aforementioned emergency messages or the emergency message itself. In the following description, it is assumed that a warning message is the same as the emergency message. In addition, the multiple concurrent warning message delivery may be used for the following cases.

Embodiment A) There may be a case where a warning message is transmitted from two different sources or two different warning notification providers to the 5G RAN 103-3. Therefore, the 5G RAN 103-3 may receive two CMAS notification or CMAS messages, PWS notification messages, PWS messages, and the like. In this case, in the two warning notification messages, message identifiers may be different from each other, and values of serial numbers may be the same as each other. This is because the serial numbers are used to distinguish the case where the sources of the warning messages, that is, the sources for distributing the warning messages are the same as each other. When the sources of the warning messages are different from each other because the warning message providers are different from each other, messages are transmitted from two sources, and thus, the identifiers of the messages are different from each other. However, the serial numbers used to distinguish the messages in each source may be the same as each other.

Example B) According to another embodiment of the disclosure, there may be a case where the warning messages are transmitted from the same warning notification provider to the 5G RAN 103-3. In this case, there may be a case where new information or new instruction is delivered or previously transmitted information is updated. In this case, when the warning notification provider transmits a warning notification to the network operator (PLMN operator), that is, the 5G RAN 103-3, the warning notification provider may update the warning message by identifying the warning notification transmitted previously through the warning message identifier.

Embodiment C) According to another embodiment of the disclosure, there may be a case where the warning messages are transmitted from the same warning notification provider to the 5G RAN 103-3. In this case, there may be a case where new information or new instruction is delivered, or is concurrent transmitted in addition to the previously transmitted information. In this case, when the warning notification provider transmits warning notifications to the network operator (PLMN operator), that is, the 5G RAN 103-3, the serial numbers of the warning notifications may be different from each other in addition to identifying a previously transmitted warning notification through a warning message identifier. In addition, in this case, a concurrent warning message indicator IE may be provided. Therefore, in a case where concurrent message transmission is supported, when the identifiers of the warning messages are the same as each other and the serial numbers thereof are different from each other, and when the concurrent warning message indicator IE is provided, the warning messages may be transmitted concurrently.

Embodiment D) According to another embodiment of the disclosure, in the warning notification message, when the identifiers of the warning messages are the same as each other and the message serial numbers thereof are the same as each other, only one warning message may be broadcast. In this manner, the UE 101 may receive the warning notification message.

In operation 507, the NG-RAN 103-2 may deliver a public warning message, a warning message, or an emergency call message to the UE 101 through cell broadcast.

Accordingly, upon receiving the emergency (or warning) message broadcast in operation 507, the UE 101 may alert warning-related information (warning message) to the user in operation 508. The alerting to the user may be performed in various methods. For example, information may be provided to the user by a method of displaying information on a display included in the UE 101 and/or a method of notifying information to a user by using sound or vibration.

In operation 509, the NG-RAN 103-3 may transmit, to the AMF 111 of the public network, a write replace warning response message that is a response message to a write replace warning request message. In this case, the IWF 171 is only involved in the routing of the write replace warning response message, and does not decode the write replace warning response message.

In operation 509, the NG-RAN 103-3 may transmit a write replace warning response message, which is a response message to a write replace warning request message, to the AMF 111 through the AMF 111-3 of the SNPN.

In this case, operation 509 may be performed after operation 506, before operation 507 of Embodiment 1), or after operation 507 of Embodiment 2). Because the warning message is broadcast in the cell, there is no need to check or receive the response from the UE 101.

In operation 510, the AMF 111 may transmit a NonUeN2infonotify message to the CBCF 181. The NonUeN2infonotify message may include a write replace warning indication NG-RAN message or may include an encapsulated write replace warning indication NG-RAN message.

In operation 511, the AMF 111 may record success or fail of message delivery in a trace record. Success or fail of recording in the trace record in the AMF 111 may not actually mean success or fail of reception in the UE 101. The emergency (or warning) message may be generally transmitted to all UEs in the cell or may be transmitted only to UEs that are pre-configured to receive the emergency message. Because the emergency message is broadcast in the cell unlike the general message, the 5G RAN does not reply the response to the success or fail of reception from the UEs. Therefore, the AMF 111 may record the case of transmitting the emergency message to the 5G RAN 103-2 as delivery success, and may record the case of not transmitting the emergency message to the 5G-RAN 103-2 as delivery fail.

Figure 6:
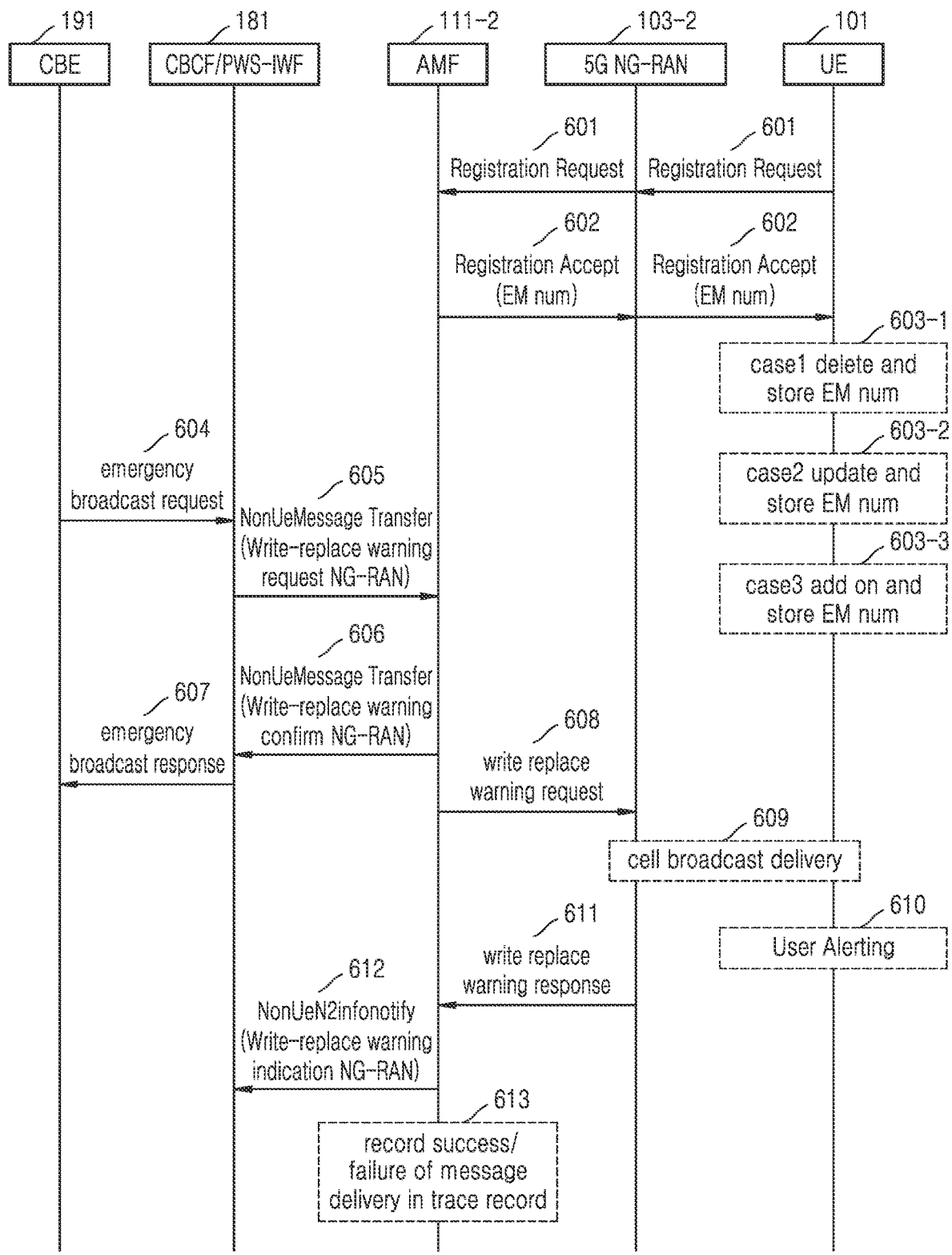
FIG. 6 is a flowchart for describing a procedure for supporting mobility for a UE in an environment where a PLMN and a SNPN coexist in a 5G network, according to an embodiment of the disclosure.

FIG. 6 is a flowchart for describing a procedure for supporting mobility for a UE in an environment where a PLMN and a SNPN coexist in a 5G network, according to an embodiment of the disclosure.

In particular, FIG. 6 is a flowchart for describing a process of efficiently delivering a PWS message and a disaster text or an emergency disaster message, such as fire, earthquake, tsunami, heavy rain, storm, heavy snow, disease, and health, in an environment where a 5G communication network and a NPN coexist, according to an embodiment of the disclosure.

FIG. 6 illustrates a process of delivering a public warning message, a CMAS message, or a text message through a network entity in a NPN, according to an embodiment of the disclosure. Accordingly, the embodiment of the disclosure illustrated in FIG. 6 relates to a case where the AMF, the 5G NG-RAN, and the like may use the AMF, the 5G NG-RAN, and the like of the NPN rather than the AMF and the 5G NG-RAN of the 3GPP operator network, that is, the general public network.

In addition, FIG. 6 illustrates an example of a case where the SNPN is capable of supporting both the PWS and the emergency call. Referring to FIG. 1, SNPN A supports both the PWS and the emergency call, and the AMF 111-2 and the 5G RAN 103-2 (specifically, 5G NR base station) may be used.

Therefore, in the embodiment of the disclosure, the disaster message may be delivered through the path of the CBE—the CBCF—the AMF of the SNPN—the 5G NG-RAN of the SNPN.

Referring to FIG. 6, in operations 601 and 602, the UE 101 may perform a registration procedure in the 5G network through the 5G NG-RAN 103-2 and the AMF 111-2, which are present in the SNPN. In this manner, the UE 101 may be registered with the AMF 111-2 of the 5G network.

In operation 601, the UE 101 transmits a registration request message to the AMF 111-2. In operation 602, when the AMF 111-2 permits registration of the UE 101, the AMF 111-2 transmits a registration accept message to the UE 101. When the AMF 111-2 supports an emergency call within the SNPN of the UE 101, the AMF 111-2 transmits an emergency call number supported in the SNPN to the UE 101 by including the emergency call number in the registration accept message. Upon receiving the registration accept message, the UE 101 may operate in various embodiments 603-1, 603-2, or 603-3 of the disclosure in operations subsequent to operation 602.

According to an embodiment of the disclosure, as in operation 603-1, the UE 101 may delete the previously received emergency call number and may store the newly received emergency call number (Embodiment 1)).

In another embodiment of the disclosure, as in operation 603-2, the UE 101 may update the emergency call number with the newly received emergency call number and store the updated emergency call number (Embodiment 2)).

According to another embodiment of the disclosure, as in operation 603-3, the UE 101 may maintain the previously received emergency call number and may store the newly received emergency call number (Embodiment 3)).

Thereafter, upon receiving an emergency call, the UE 101 may use the stored emergency call number to map the number matching the emergency situation received from the user when the UE 101 is in the SNPN with the emergency call number supported in its own SNPN and may perform an emergency call operation, such as making a phone call or a text message as an emergency call, by mapping to a number supporting an accurate emergency call.

In operation 604, the CBE 191 may transmit, to the CBCF 181, an emergency broadcast request message for transmission of the emergency message at a specific time point when the transmission of the emergency message is required.

Upon receiving the emergency broadcast request message, the CBCF 181 may transmit a NonUEMessageTransfer message to the AMF 111 of the public network in operation 605. The NonUEMessageTransfer message may include a write replace warning request NG-RAN message or may include an encapsulated write replace warning request NG-RAN message.

In operation 606, the AMF 111-2 may generate a NonUeMessageTransfer message in response to the NonUEMessageTransfer message and transmit the generated NonUeMessageTransfer message to the CBCF 181. The NonUeMessageTransfer message, which is the response message, may include a write replace warning confirm NG-RAN message or may include an encapsulated write replace warning confirm NG-RAN message.

Accordingly, in operation 607, the CBCF 181 may transmit an emergency broadcast response message to the CBE 191 to notify that an emergency broadcast message may be transmitted.

In operation 608, the AMF 111-2 may transmit a write replace warning request message to the SNPN access, that is, the 5G RAN 103-2 in an embodiment of the disclosure.

The write replace warning request message may support multiple concurrent warning message delivery. The multiple concurrent warning message delivery may refer to a case where the same message is concurrently transmitted through the operator network by different warning message providers, or a case where a plurality of warning messages are transmitted by updating the contents, instructions, and information of the message. In addition, the warning message may be one of the aforementioned emergency messages or the emergency message itself. In the following description, it is assumed that a warning message is the same as the emergency message. In addition, the multiple concurrent warning message delivery may be used for the following cases.

Embodiment A) There may be a case where a warning message is transmitted from two different sources or two different warning notification providers to the 5G RAN 103-3. Therefore, the 5G RAN 103-3 may receive two CMAS notification or CMAS messages, PWS notification messages, PWS messages, and the like. In this case, in the two warning notification messages, message identifiers may be different from each other, and values of serial numbers may be the same as each other. This is because the serial numbers are used to distinguish the case where the sources of the warning messages, that is, the sources for distributing the warning messages are the same as each other. When the sources of the warning messages are different from each other because the warning message providers are different from each other, messages are transmitted from two sources, and thus, the identifiers of the messages are different from each other. However, the serial numbers used to distinguish the messages in each source may be the same as each other.

Example B) According to another embodiment of the disclosure, there may be a case where the warning messages are transmitted from the same warning notification provider to the 5G RAN 103-3. In this case, there may be a case where new information or new instruction is delivered or previously transmitted information is updated. In this case, when the warning notification provider transmits a warning notification to the network operator (PLMN operator), that is, the 5G RAN 103-3, the warning notification provider may update the warning message by identifying the warning notification transmitted previously through the warning message identifier.

Embodiment C) According to another embodiment of the disclosure, there may be a case where the warning messages are transmitted from the same warning notification provider to the 5G RAN 103-3. In this case, there may be a case where new information or new instruction is delivered and is concurrent transmitted in addition to the previously transmitted information. In this case, when the warning notification provider transmits warning notifications to the network operator (PLMN operator), that is, the 5G RAN 103-3, the serial numbers of the warning notifications may be different from each other in addition to identifying a previously transmitted warning notification through a warning message identifier. In addition, in this case, a concurrent warning message indicator IE may be provided. Therefore, in a case where concurrent message transmission is supported, when the identifiers of the warning messages are the same as each other and the serial numbers thereof are different from each other, and when the concurrent warning message indicator IE is provided, the warning messages may be transmitted concurrently.

Embodiment D) According to another embodiment of the disclosure, in the warning notification message, when the identifiers of the warning messages are the same as each other and the message serial numbers thereof are the same as each other, only one warning message may be broadcast. In this manner, the UE 101 may receive the warning notification message.

In operation 609, the NG-RAN 103-2 may deliver a public warning message, a warning message, or an emergency call message to the UE 101 through cell broadcast.

Accordingly, upon receiving the emergency (or warning) message broadcast in operation 609, the UE 101 may alert warning-related information (warning message) to the user in operation 610. The alerting to the user may be performed in various methods. For example, information may be provided to the user by a method of displaying information on a display included in the UE 101 and/or a method of notifying information to a user by using sound or vibration.

In operation 611, the NG-RAN 103-2 may transmit, to the AMF 111, write replace warning response message that is a response message to a write replace warning request message.

In this case, operation 611 may be performed after operation 608, before operation 609 of Embodiment 1), or after operation 609 of Embodiment 2). Because the warning message is broadcast in the cell, there is no need to check or receive the response from the UE 101.

In operation 612, the AMF 111-2 may transmit a NonUeN2infonotify message to the CBCF 181. The NonUeN2infonotify message may include a write replace warning indication NG-RAN message or may include an encapsulated write replace warning indication NG-RAN message.

In operation 613, the AMF 111-2 may record success or fail of message delivery in a trace record. Success or fail of recording in the trace record in the AMF 111-2 may not actually mean success or fail of reception in the UE 101. The emergency (or warning) message may be generally transmitted to all UEs in the cell or may be transmitted only to UEs that are pre-configured to receive the emergency message. Because the emergency message is broadcast in the cell unlike the general message, the 5G RAN does not reply the response to the success or fail of reception from the UEs. Therefore, the AMF 111-2 may record the case of transmitting the emergency message to the 5G RAN 103-2 as delivery success, and may record the case of not transmitting the emergency message to the 5G-RAN 103-2 as delivery fail.

Figure 7:
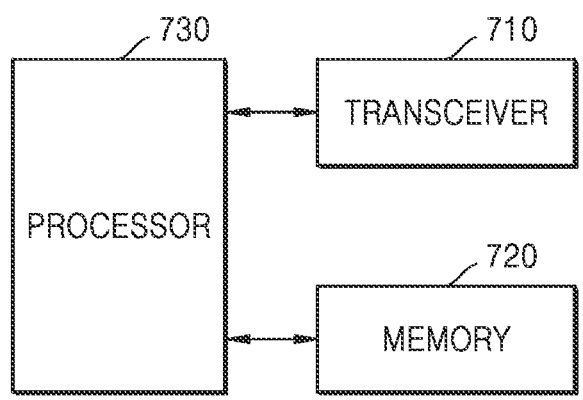
FIG. 7 is a block diagram illustrating a structure of a UE according to an embodiment of the disclosure.

FIG. 7 is a block diagram illustrating a structure of a UE according to an embodiment of the disclosure.

Referring to FIG. 7, the UE according to an embodiment of the disclosure may include a transceiver 710, a memory 720, and a processor 730. The processor 730, the transceiver 710, and the memory 720 of the UE may operate according to the communication method of the UE described above. However, the elements of the UE are not limited to the example described above. For example, the UE may include more or fewer elements than the elements described above. In addition, the processor 730, the transceiver 710, and the memory 720 may be implemented in the form of a single chip.

The transceiver 710 collectively refers to a receiver of the UE and a transmitter of the UE, and may transmit and receive signals to and from a base station or a network entity. The signals, which are transmitted and received to and from the base station, may include control information and data. To this end, the transceiver 710 may include a radio frequency (RF) transmitter that performs up-conversion and amplification on a frequency of a signal to be transmitted, and an RF receiver that performs low noise amplification on a received signal and performs down-conversion on the received signal. However, this is only an embodiment of the transceiver 710, and the elements of the transceiver 710 are not limited to the RF transmitter and the RF receiver.

In addition, the transceiver 710 may include a wired/wireless transceiver, and may include various elements configured to transmit and receive signals.

In addition, the transceiver 710 may receive a signal through a radio channel, output the received signal to the processor 730, and transmit an output signal of the processor 730 through the radio channel.

Moreover, the transceiver 710 may receive a communication signal, output the received communication signal to the processor 730, and transmit an output signal of the processor 730 to the network entity through a wired/wireless network.

The memory 720 may store programs and data required for the operation of the UE. In addition, the memory 720 may store control information or data included in the signals obtained by the UE. The memory 720 may include a storage medium, such as read-only memory (ROM), random access memory (RAM), hard disk, compact disc-ROM (CD-ROM), and digital versatile disc (DVD), or any combination thereof.

The processor 730 may control a series of processes so that the UE is able to operate according to the above-described embodiments of the disclosure. The processor 730 may include least one or more processors. For example, the processor 730 may include a communication processor (CP) that performs control for communication, and an application processor (AP) that controls an upper layer, such as an application program.

Figure 8:
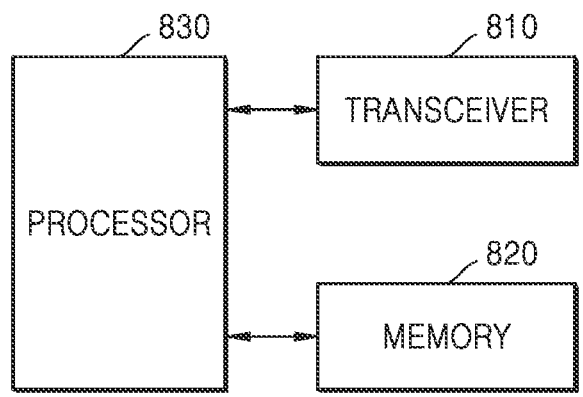
FIG. 8 is a block diagram illustrating a structure of a network entity according to an embodiment of the disclosure.

FIG. 8 is a block diagram illustrating a structure of a network entity according to an embodiment of the disclosure.

Referring to FIG. 8, the network entity according to an embodiment of the disclosure may include a transceiver 810, a memory 820, and a processor 830. The processor 830, the transceiver 810, and the memory 820 of the network entity may operate according to the communication method of the network entity described above. However, the elements of the network entity are not limited to the example described above. For example, the network entity may include more or fewer elements than the elements described above. In addition, the processor 830, the transceiver 810, and the memory 820 may be implemented in the form of a single chip. The network entity may include the above-described NFs, such as the AMF, the SMF, the PCF, network exposure function (NEF), the UDM, and the UPF. In addition, the network entity may include a base station.

The transceiver 810 collectively refers to a receiver of the network entity and a transmitter of the network entity, and may transmit and receive signals to and from a UE or other network entities. The signals, which are transmitted and received to and from the UE or other network entities, may include control information and data. To this end, the transceiver 810 may include an RF transmitter that performs up-conversion and amplification on a frequency of a signal to be transmitted, and an RF receiver that performs low noise amplification on a received signal and performs down-conversion on the received signal. However, this is only an embodiment of the transceiver 810, and the elements of the transceiver 810 are not limited to the RF transmitter and the RF receiver. The transceiver 810 may include a wired/wireless transceiver, and may include various elements configured to transmit and receive signals.

In addition, the transceiver 810 may receive a signal through a communication channel (e.g., a radio channel), output the received signal to the processor 830, and transmit an output signal of the processor 830 through the communication channel.

Moreover, the transceiver 810 may receive a communication signal, output the received communication signal to the processor 830, and transmit an output signal of the processor 830 to the UE or the network entity through a wired/wireless network.

The memory 820 may store programs and data required for the operation of the network entity. In addition, the memory 820 may store control information or data included in signals obtained by the network entity. The memory 820 may include a storage medium, such as ROM, RAM, hard disk, CD-ROM, and DVD, or any combination thereof.

The processor 830 may control a series of processes so that the network entity is able to operate according to the above-described embodiments of the disclosure. The processor 830 may include least one or more processors. The methods according to the embodiments of the disclosure, which are described in the claims or the detailed description, may be implemented as hardware, software, or a combination of hardware and software.

When implemented as software, a non-transitory computer-readable storage medium storing one or more programs (software modules) may be provided. One or more programs stored in the computer-readable storage medium are configured to be executable by one or more processors in an electronic device. One or more programs include instructions that cause the electronic device to execute the methods according to the embodiments of the disclosure, which are described in the claims or the specification of the disclosure.

One or more programs (software modules, software, etc.) may be stored in RAM, non-volatile memory including flash memory, ROM, electrically erasable programmable read-only memory (EEPROM), magnetic disc storage devices, CD-ROM, DVDs, other types of optical storage devices, or magnetic cassettes. Alternatively, one or more programs may be stored in a memory provided by a combination of all or part of these devices. In addition, each memory may include a plurality of configured memories.

Furthermore, the programs may be stored in an attachable storage device that is accessible through a communication network, such as Internet, Intranet, local area network (LAN), wide area network (WAN), or storage area network (SAN), or a communication network provided by a combination thereof. These storage devices may be connected through an external port to a device that performs the embodiments of the disclosure. Moreover, a separate storage device on the communication network may access the device that performs the embodiment of the disclosure.

According to an embodiment of the disclosure, when the UE moves between the 3GPP PLMN and the SNPN, the PWS or the emergency call may be efficiently supported.

In specific embodiments of the disclosure, the elements included in the disclosure have been expressed in the singular or plural form according to the suggested specific embodiments of the disclosure. However, the expression in the singular or plural form is appropriately selected according to the suggested situations for convenience of explanation and is not intended to limit the disclosure to the single or plural elements. Even when a certain element is expressed in the plural form, it may be provided with a single element, and even when a certain element is expressed in the singular form, it may be provided with a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
    selecting a stand-alone non-public network (SNPN) based on at least one of whether the SNPN supports a public warning system (PWS) or whether the SNPN supports an emergency call;

transmitting, to a base station within the selected SNPN, a registration request message including information associated with supporting the PWS; and receiving, from the base station, a registration accept message, wherein the registration request message includes PWS priority information and UE-SNPN-version information, wherein the PWS priority information indicates that the UE prefers to access a network supporting the PWS with priority, and wherein the UE-SNPN-version information indicates whether the UE supports the PWS.

2. The method of claim 1, wherein the selecting of the SNPN further comprises selecting the SNPN based on priority information for selecting the SNPN.

3. The method of claim 1, wherein an operator-controlled public land mobile network (PLMN) list including information of at least one SNPN that is accessible to the UE is pre-configured in a universal subscriber identity module (USIM) of the UE.

4. The method of claim 1, wherein the registration accept message includes information of at least one SNPN that is accessible to the UE.

5. The method of claim 4, further comprising:
storing the information of the at least one SNPN that is accessible to the UE in an operator-controlled PLMN list.

6. The method of claim 1, further comprising:
storing at least one emergency call number supported by the SNPN, the at least one emergency call number supported by the SNPN being included in the registration accept message.

7. The method of claim 6, wherein the storing of the at least one emergency call number supported by the SNPN comprises one of:
deleting one or more emergency call numbers stored in the UE and storing the at least one emergency call number supported by the SNPN;
updating the one or more emergency call numbers stored in the UE with the at least one emergency call number supported by the SNPN; or
storing the at least one emergency call number supported by the SNPN in addition to the one or more emergency call numbers stored in the UE.

8. A user equipment (UE) in a wireless communication system, the UE comprising:
a transceiver; and
at least one processor configured to:
select a stand-alone non-public network (SNPN) based on at least one of whether the SNPN supports a public warning system (PWS) or whether the SNPN supports an emergency call,
transmit, to a base station within the selected SNPN, a registration request message including information associated with supporting the PWS, and
receive, from the base station, a registration accept message, wherein the registration request message includes PWS priority information and UE-SNPN-version information, wherein the PWS priority information indicates that the UE prefers to access a network supporting the PWS with priority, and wherein the UE-SNPN-version information indicates whether the UE supports the PWS.

9. A method performed by a base station in a wireless communication system, the method comprising:
receiving, from a user equipment (UE), a registration request message including information associated with supporting a public warning system (PWS); and
transmitting, to the UE, a registration accept message, wherein the base station is within a stand-alone non-public network (SNPN) which is selected by the UE based on at least one of whether the SNPN supports the PWS or whether the SNPN supports an emergency call, wherein the registration request message includes PWS priority information and UE-SNPN-version information, wherein the PWS priority information indicates that the UE prefers to access a network supporting the PWS with priority, and wherein the UE-SNPN-version information indicates whether the UE supports the PWS.

10. The method of claim 9, wherein the SNPN is selected by the UE based on priority information for selecting the SNPN.

11. The method of claim 9, wherein an operator-controlled PLMN list including information of at least one SNPN that is accessible to the UE is pre-configured in a universal subscriber identity module (USIM) of the UE.

12. The method of claim 9, wherein the registration accept message includes information of at least one SNPN that is accessible to the UE.

13. The method of claim 9, wherein the registration accept message includes at least one emergency call number supported by the SNPN.

14. A base station in a wireless communication system, the base station comprising:
a transceiver; and
at least one processor configured to:
receive, from a user equipment (UE), a registration request message including information associated with supporting a public warning system (PWS), and
transmit, to the UE, a registration accept message, wherein the base station is within a stand-alone non-public network (SNPN) which is selected by the UE based on at least one of whether the SNPN supports the PWS or whether the SNPN supports an emergency call, wherein the registration request message includes PWS priority information and UE-SNPN-version information, wherein the PWS priority information indicates that the UE prefers to access a network supporting the PWS with priority, and wherein the UE-SNPN-version information indicates whether the UE supports the PWS.

\* \* \* \* \*